D. BASKERVILLE.
HITCH FOR GANG PLOWS.
APPLICATION FILED OCT. 14, 1912.
1,101,777.
Patented June 30, 1914.
2 SHEETS—SHEET 1.
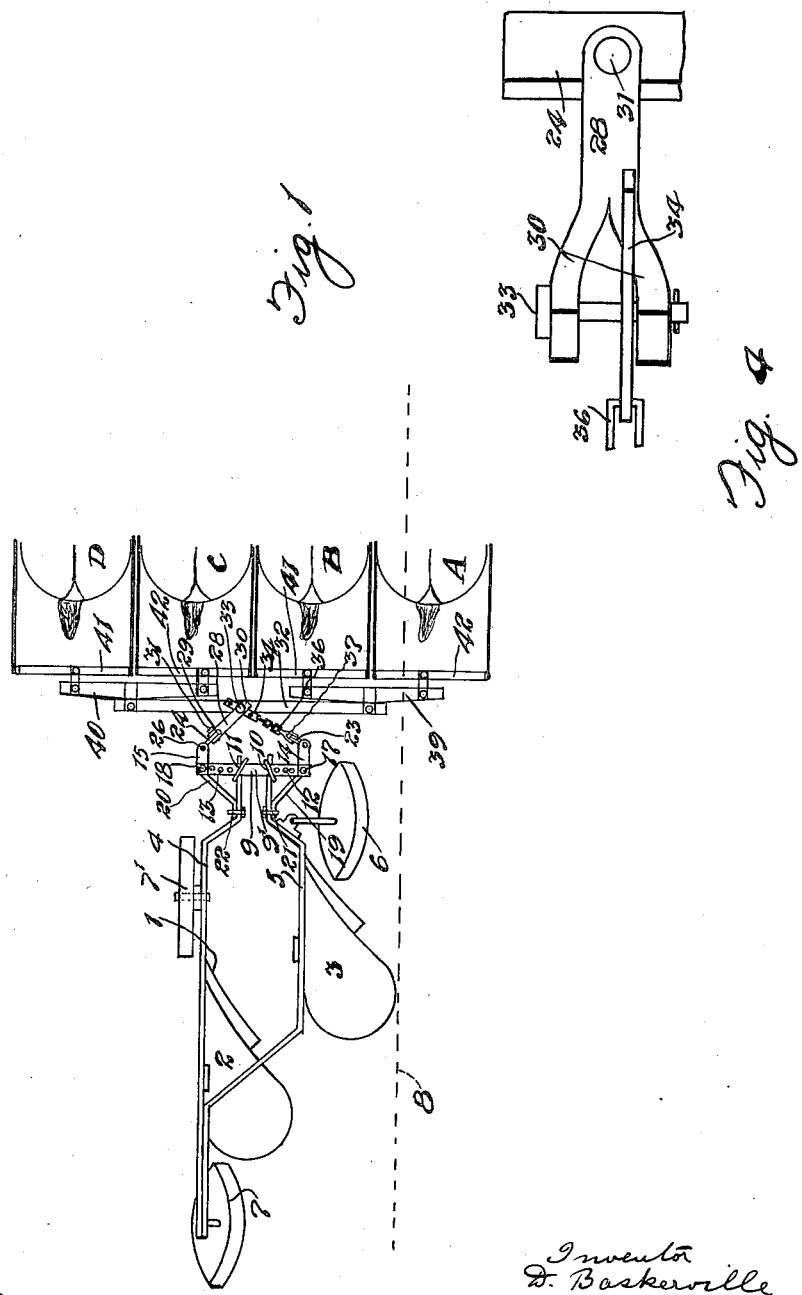

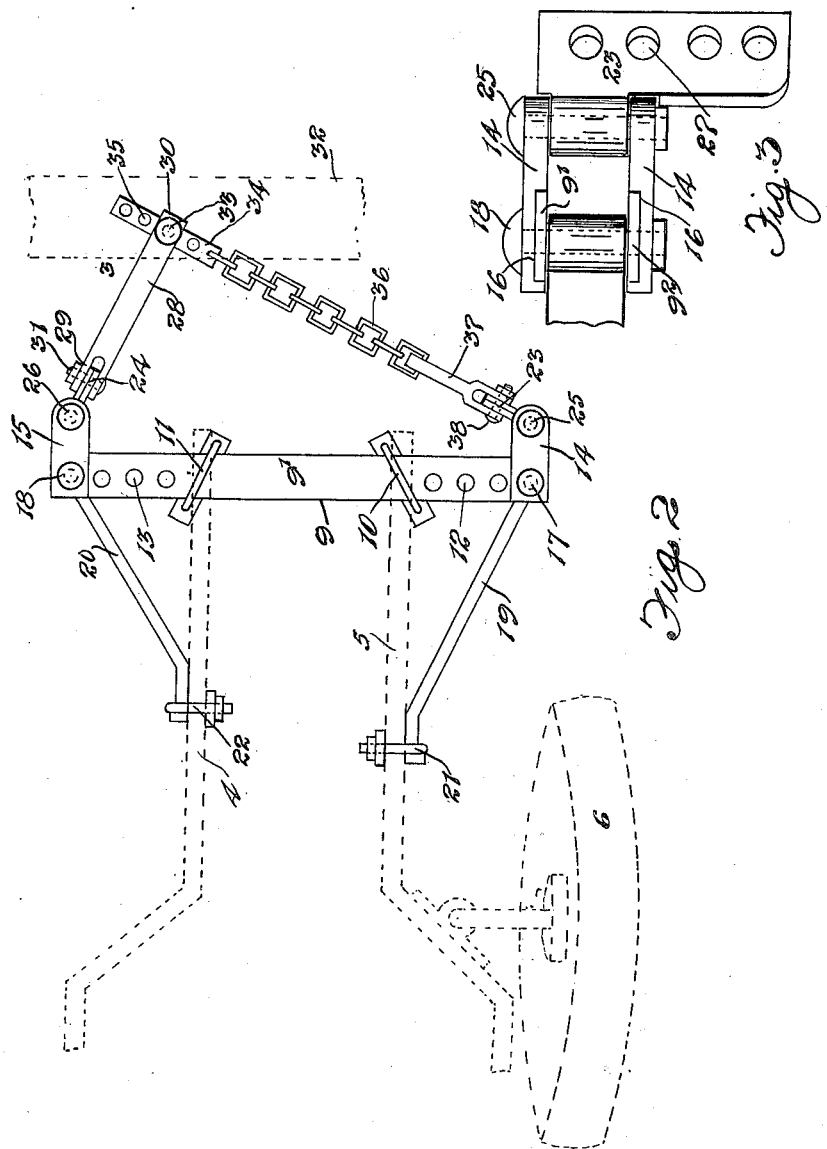

UNITED STATES PATENT OFFICE.

DAVID BASKERVILLE, OF FRANKLIN, MANITOBA, CANADA.

HITCH FOR GANG-PLOWS.

1,101,777.  Specification of Letters Patent.  Patented June 30, 1914.

Application filed October 14, 1912. Serial No. 725,580.

*To all whom it may concern:*

Be it known that I, DAVID BASKERVILLE, of the village of Franklin, in the Province of Manitoba, Canada, have invented certain new and useful Improvements in Hitches for Gang-Plows, of which the following is the specification.

The invention relates to an improved hitch or side draft evener for a gang plow or such form of implement and the object of the invention is to provide a device which will allow the draft animals to be connected with a gang plow in such a manner that only one animal has to walk in the furrow the remaning animals walking on the unplowed land, such device being constructed so that there is an even draft on the plow with the animals so arranged.

With the above objects in view the invention consists essentially in a draft beam secured to the plow beams, pairs of clamping plates adjustably secured to the ends of the beam, a pair of evener clevises carried by the clamping plates, a draft bar adjustably connected to one of the clevises, an adjustable plate pivotally secured to the draft bar and a flexible connection such as a chain connecting the adjustable plate adjustably with the other of the clevises, the parts being arranged and constructed as hereinafter more particularly described.

Figure 1 is a plan view of a gang plow with my device attached showing also the location of the double tree with four horses attached. Fig. 2 is an enlarged detailed plan view of the device. Fig. 3 is an enlarged detail side view of the clamping plates and one of the clevises. Fig. 4 is a front view of the forward end of the draft bar and the adjustable plate with attached chain.

In the drawings like characters of reference indicate corresponding parts in each figure.

1 represents the usual form of gang plow provided in the present instance with a pair of plows 2 and 3 carried by the plow beams 4 and 5 and mounted on the wheels 6 and 7, and guide wheel 7'.
Considering the plow in operation in the field the line 8 indicates the location of the furrow last turned by the plow, the land on the left hand side of this line in advance of the plow being unplowed while that on the right hand side is plowed.

9 is a draft beam secured to the forward ends of the plow beams by U-bolts 10 and 11 which draft beam is provided at its extremities with sets of spaced vertically directed openings 12 and 13. This beam in the present case comprises a top cross bar 9' and a bottom cross bar 9² which bear on the upper and lower faces of the plow beams respectively and are held securely to the beams by the U-bolts.

14 and 15 are pairs of clamping plates having their rear ends notched at 16 to receive the bars 9' and 9² respectively. The pairs of clamping plates are held to the draft beam by bolts 17 and 18 passing through the openings 12 and 13 therein.

19 and 20 are angularly disposed braces having their forward ends formed into eyes passed between the bars 9' and 9² and receiving the bolts 17 and 18 and their rear ends fastened to the plow beams by U-bolts 21 and 22.

23 and 24 are adjustable clevises mounted pivotally on upright bolts 25 and 26 carried by the forwardly extending ends of the pairs of clamping plates 14 and 15. The clevises are supplied with a number of spaced openings 27 for adjusting purposes.

28 is a draft bar having the ends thereof oppositely forked at 29 and 30, that is to say the fork 29 appears in the vertical plane while the fork 30 appears in the horizontal plane. The rear end of the draft bar is adjustably secured to the clevis by a bolt 31 passing through one or other of the openings 27 therein. The forward end of the draft bar is adapted to span the double tree 32 the double tree being connected pivotally to the bar by a vertically disposed king bolt 33.

34 is a plate supplied with a number of spaced openings 35 one or other of the openings receiving the bolt 33. The plate carries a chain 36 or other such flexible connection which is equipped with a coupling rod 37 fastened to the clevis 23 by a bolt 38. The double tree it will be noticed is centered on the king bolt and carries at its ends equalizer bars 39 and 40 supplied with the usual pairs of whiffle trees 41 and 42 to which are attached the draft animals as at A, B, C, and D.

Where four horses are used to draw the plow it will be noticed that the king bolt 33 is what might be called off center, that is it is not on the center line passing forwardly from a point centrally between the plow beams but is toward the land side. Accordingly the draft bar is disposed at a greater angle to the draft beam than the chain. With the double tree centered on the king bolt the construction permits the horse A to walk in the last furrow turned by the gang plow while the remaining horses walk freely on the land side. The side draft of the plows 2 and 3 is also overcome by the angular disposition of the draft bar chain. Heretofore in hitches it has been customary for one horse to walk in the furrow, one horse to walk on the plowed land and the remaining horses to walk on the land side or unplowed land.

It is pointed out that, owing to the manner in which the various parts can be adjusted by removing the various bolts and reinserting them in other openings, the position of the king bolt can be varied to a point close to or considerably away from the center line of the plow as hereinbefore referred to. The varying of the position of the king bolt will give the rear end of the gang plow a greater or less swing away from the land side, this swing being utilized to offset the side draft of the plows.

What I claim as my invention is:—

In a soil-furrowing implement, the combination with the plow-beams thereof, of a draft-beam including parallel members having notches in opposed surfaces thereof, adapted to receive said parallel members, braces between said plow-beams and said draft-beam, bolt-connections between said parallel members and said braces, transverse members extending forwardly from said draft-beam, certain of the bolts of said connections also effecting connection between said transverse members and said parallel members, a draft-bar, adjusting devices, one of said devices effecting connection between said draft-bar and said draft-beam, and an adjustable flexible and coupling-rod connection between the outer or forward end of said draft-bar and the other of said devices.

Signed at Mumedosa Man. this 20th day of June, 1912.

DAVID BASKERVILLE.

In the presence of—
JOHN T. HANNA,
BELLA CAMPBELL.

Copies of this patent may be obtained for five cents each, by addressing the "Commissioner of Patents, Washington, D. C."